US012611772B2

(12) United States Patent
Nakasu et al.

(10) Patent No.: US 12,611,772 B2
(45) Date of Patent: Apr. 28, 2026

(54) ROBOT CONTROL DEVICE AND ROBOT CONTROL METHOD

(71) Applicant: Hitachi, Ltd., Tokyo (JP)

(72) Inventors: Nobuaki Nakasu, Tokyo (JP); Kaichiro Nishi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 142 days.

(21) Appl. No.: 18/746,382

(22) Filed: Jun. 18, 2024

(65) Prior Publication Data

US 2025/0010469 A1     Jan. 9, 2025

(30) Foreign Application Priority Data

Jul. 4, 2023     (JP) ................................. 2023-110107

(51) Int. Cl.
*B25J 9/16*     (2006.01)
*B25J 13/08*     (2006.01)

(52) U.S. Cl.
CPC ........... B25J 9/1664 (2013.01); B25J 9/1674 (2013.01); B25J 13/08 (2013.01)

(58) Field of Classification Search
CPC ........ B25J 9/1664; B25J 9/1674; B25J 13/08; B25J 13/085; B25J 9/1633; B25J 9/1612; B25J 13/082; B25J 9/10; G05B 2219/39322; G05B 2219/39529; G05B 2219/40599
See application file for complete search history.

(56) References Cited

U.S. PATENT DOCUMENTS

| | | | | |
|---|---|---|---|---|
| 12,427,676 | B2 * | 9/2025 | Oba .......................... | B25J 9/162 |
| 2016/0288326 | A1 * | 10/2016 | Furuya ................... | B25J 9/1633 |
| 2022/0297958 | A1 * | 9/2022 | Moreno ................... | B25J 13/08 |
| 2022/0314455 | A1 * | 10/2022 | Nagasue .............. | B23Q 17/249 |

(Continued)

FOREIGN PATENT DOCUMENTS

| | | | | | |
|---|---|---|---|---|---|
| EP | | 2381325 | A1 * | 10/2011 | ............ B25J 9/1656 |
| JP | | 2012-176477 | A | 9/2012 | |
| WO | WO-2022024976 | A1 * | 2/2022 | ............ B25J 13/08 | |

OTHER PUBLICATIONS

Translation of WO-2022024976-A1 (Year: 2022).*

*Primary Examiner* — Adam R Mott
*Assistant Examiner* — James Miller Watts, III
(74) *Attorney, Agent, or Firm* — MATTINGLY & MALUR, PC

(57)     ABSTRACT

A robot that attaches and removes a work with respect to a machining device is controlled to correct a deviation of the robot's posture. A robot control device includes a correcting part that corrects a posture of the robot based on a measured value of a sensor that measures a load on the robot; a robot posture obtaining part; a work attachment target posture generating part; and a path generating part. The correcting part corrects the posture of the robot to decrease the load on the robot to be smaller than a threshold when the robot grips the work after machining. The robot posture obtaining part obtains a removal posture that is the posture of the robot after the correction for a plurality of the works after machining. The work attachment target posture generating part generates a new work attachment target posture based on a plurality of the removal postures.

13 Claims, 11 Drawing Sheets

(56) References Cited

U.S. PATENT DOCUMENTS

| | | | |
|---|---|---|---|
| 2023/0278205 A1* | 9/2023 | Yamaoka | B25J 9/1687 |
| | | | 700/260 |
| 2023/0390924 A1* | 12/2023 | Oba | B25J 9/163 |
| 2024/0351209 A1* | 10/2024 | Graabæk | G06N 20/00 |
| 2024/0391099 A1* | 11/2024 | Satou | B25J 13/08 |

* cited by examiner

FIG. 3A

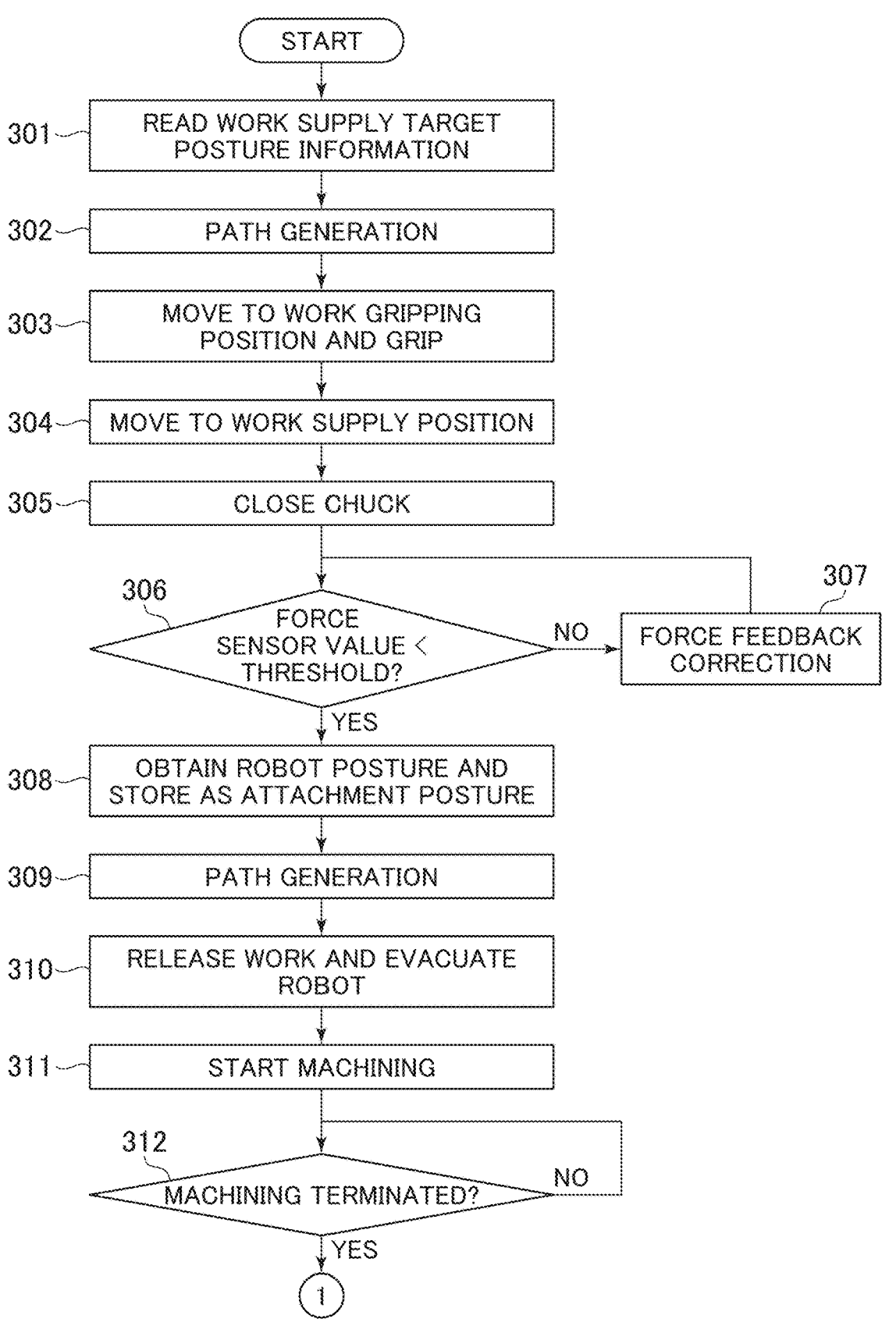

START

301 — READ WORK SUPPLY TARGET POSTURE INFORMATION

302 — PATH GENERATION

303 — MOVE TO WORK GRIPPING POSITION AND GRIP

304 — MOVE TO WORK SUPPLY POSITION

305 — CLOSE CHUCK

306 — FORCE SENSOR VALUE < THRESHOLD?

NO → 307 FORCE FEEDBACK CORRECTION

YES

308 — OBTAIN ROBOT POSTURE AND STORE AS ATTACHMENT POSTURE

309 — PATH GENERATION

310 — RELEASE WORK AND EVACUATE ROBOT

311 — START MACHINING

312 — MACHINING TERMINATED? NO

YES

1

501

CHUCK NAIL
501

CHUCK
5B

506
HAND GRIPPING
SURFACE

506
HAND GRIPPING
SURFACE

501

501

504

PRE-MACHINING
SHAPE
502

POST-MACHINING
SHAPE
503

WORK
DIMENSIONAL
ERROR
506

ATTACHMENT POSTURE INFORMATION 221,
REMOVAL POSTURE INFORMATION 222,
WORK SUPPLY TARGET POSTURE INFORMATION 223,
WORK DIMENSIONAL ERROR INFORMATION 224

| No | x | y | z | Roll | Pitch | yaw |
|----|-----|-----|-----|------|-------|-----|
| 1 | 90 | 86 | 0 | 29 | 45 | 180 |
| 2 | 90.5 | 86 | 0 | 29 | 44.5 | 175 |
| 3 | 90 | 86 | 1 | 29 | 44.3 | 170 |
| ... | | | | | | |
| n | 60 | 86 | 1.1 | 29 | 44 | 100 |

THRESHOLD INFORMATION 225

| ITEM | EXAMPLE |
|------|---------|
| TERMINATION THRESHOLD FOR FORCE FEEDBACK CORRECTION (Tf) | 1N |
| DETERMINATION THRESHOLD FOR WORK SUPPLY TARGET POSTURE UPDATE (Tp) | 5 mm |
| ABNORMALITY DETERMINATION THRESHOLD FOR REMOVAL POSTURE ERROR VARIATION (Trs) | 3 mm |
| ABNORMALITY DETERMINATION THRESHOLD FOR REMOVAL POSTURE ERROR CENTER POSITION (Trc) | 4 mm |
| DETERMINATION THRESHOLD FOR WORK DIMENSIONAL ERROR VARIATION ABNORMALITY (Tws) | 1 mm |
| DETERMINATION THRESHOLD WITH RESPECT TO WORK DIMENSIONAL ERROR TRANSITION (Twc) | 6 mm |

ROBOT CONTROL DEVICE AND ROBOT CONTROL METHOD

CLAIM OF PRIORITY

The present application claims priority from Japanese patent application JP 2023-110107 filed on Jul. 4, 2023, the content of which is hereby incorporated by reference into this application.

TECHNICAL FIELD

The present invention relates to a technology of controlling a robot, and specifically to a technology of controlling a robot that supplies a work to an automatic machine tool.

BACKGROUND ART

If there is a deviation in a posture of a robot supplying a work when the robot is attaching a processing object (work) to a machining device, the robot may be excessively loaded by the machining device gripping the work. For example, Japanese Unexamined Patent Application Publication No. 2012-176477 (Patent Literature 1) has been disclosed as a technology of adjusting the posture of the robot supplying a work.

Patent Literature 1 describes "(A) generating track data from a CAD model of a work and storing the track data in a storage unit, (B)setting a target track before machining by profiling the work at a profiling speed lower than a machining speed along the track data without machining the work and by modifying the track data from an operating position, (C) subsequently, controlling a position of a machining tool at the machining speed based on the target track without contacting the work and storing the track data as target track data to be used for machining by repeating learning of remodifying the track data, and (D) during the machining, machining the work by controlling the position of the machining tool at the machining speed based on the track data after the learning".

CITATION LIST

Patent Literature

Patent Literature 1: Japanese Unexamined Patent Application Publication No. 2012-176477

SUMMARY OF INVENTION

Technical Problem

There is conventionally a method of adjusting a work supply posture of the robot by simultaneously gripping a masterwork without a dimensional error by a holding device (chuck) of the machining device and the robot, adjusting the robot posture so as not to load the robot, and registering the posture.

For example, Patent Literature 1 describes a technology of machining a work, when machining the work held by a holding device using a machining tool attached to the tip of a robot arm, by learning track data of the robot using a work before machining and controlling the machining tool based on the learned track data. Similarly, this technology can prevent that excessive load is applied to the robot by the robot grasping the work before machining and moving it to a position to be held by the chuck of the machining device, learning a posture with which the robot is not loaded when the chuck holds the work, and subsequent works in the learned posture.

However, there is actually a problem that the operation efficiency may be lowered by stopping production and performing the learning using the masterwork, for example, every time the dimension of the work before machining is changed due to change of a manufacturing process of the work to be machined, the dimensional error or the work is large like a casting, or the dimension of a hand of the robot that supplies the work is changed due to replacement or deformation of the hand.

An object of the present invention is to provide a method of correcting a deviation of a posture of a robot supplying a work while continuing production using the work to be machined.

Solution to Problem

To solve the above-mentioned problem, the present invention employs, for example, a configuration described in the claims of the invention. The present application includes a plurality of means for solving the above-mentioned problem, an example of which is described below. That is, a robot control device for controlling a robot that attaches and removes a work with respect to a machining device, the robot control device comprising: a correcting part that corrects a posture of the robot based on a measured value of a sensor that measures a load on the robot; a robot posture obtaining part that obtains the posture of the robot; a storage part that stores the posture of the robot obtained by the robot posture obtaining part; a work attachment target posture generating part that generates a work attachment target posture that is a target posture to attach the work to the machining device; and a path generating part that generates a motion of the robot corresponding to the work attachment target posture, in which the correcting part corrects the posture of the robot to decrease the load on the robot when the robot grips the work after machining by the machining device, in which the robot posture obtaining part obtains a removal posture that is the posture of the robot after the correction for a plurality of the works after machining and stores the removal posture in the storage part, and in which the work attachment target posture generating part generates a new work attachment target posture based on a plurality of the removal postures stored in the storage part.

Advantageous Effects of Invention

According to an aspect of the present invention, it is possible to correct a deviation of a posture of a robot supplying a work while continuing production using the work to be machined. Other problems, configurations, and effects than those described above will become apparent from description of the following examples.

BRIEF DESCRIPTION OF DRAWINGS

FIG. 3A is a flowchart illustrating an example process performed by the robot control device according to an embodiment of the present invention;

FIG. 8 is an explanatory drawing showing an example of attachment posture information, removal posture information, work supply target posture information, and work dimensional error information retained by the robot control device according to an embodiment of the present invention;

FIG. 9 is an explanatory drawing showing an example of threshold information retained by the robot control device according to an embodiment of the present invention;

DESCRIPTION OF EMBODIMENTS

In the following, embodiments of the present invention will be described with reference to accompanying drawings. Embodiments of the present invention will be described in detail below using the drawings. Although the description is divided into a plurality of sections or embodiments for explanation when required for convenience, they are not irrelevant to one another but one may be a part or all of a modification, details, a supplementary explanation, or the like of another unless specifically stated otherwise. Moreover, when a number or the like of elements (including a count, numerical value, amount, range, and the like) is referenced in the following, the value is not limited to the specific number unless specifically stated otherwise or unless apparently limited to a specific number in principle.

Figure 1:
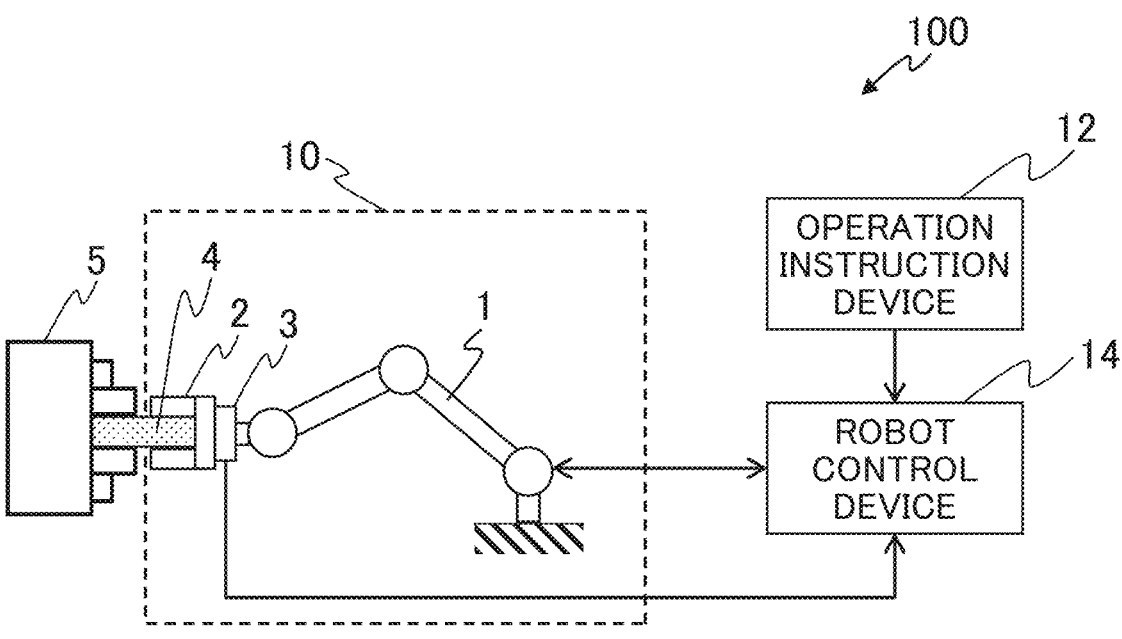
FIG. 1 is a block diagram illustrating an example of a configuration of a work supply system using a robot according to an embodiment of the present invention.

FIG. 1 is a block diagram illustrating an embodiment of configuration of a work supply system 100 using a robot according to an embodiment of the present invention.

The work supply system 100 is constituted by a work supply device 10, a robot control device 14, and an operation instruction device 12. The work supply device 10 is constituted by a robot arm 1, a hand 2, and a force sensor 3. The hand 2 is attached to the tip of the robot arm 1, which moves according to a motion instruction from the robot control device 14.

The work supply device 10 performs a motion of moving the processing object (work) 4 before machining from its storage position to a position to be held by a holding device (chuck) 5 of the machining device and a motion of moving the work 4 from the position held by the chuck 5 to the storage position. The operation instruction device 12 instructs from where to where to move the work 4, i.e., positions of an origin and a destination. The robot control device 14 generates a moving path of the work 4 from the origin to the destination, and controls postures of the robot arm 1 and the hand 2 so that the work 4 moves along the moving path. Moreover, the robot control device 14 corrects the postures of the robot arm 1 and the hand 2 by obtaining a measured value of the force sensor 3, and the position, the posture, or a joint angle of the robot arm 1 and feeding back the values.

FIG. 1 illustrates the chuck 5 of the machining device with the illustration of the main body of the machining device omitted. The machining device may be, for example, a turning lathe or an end milling machine, or may be any other machine.

Although the robot arm 1 is illustrated as being configured to be fixed to the floor, the robot arm 1 may be attached to a moving body (not shown) such as a hand truck or an automatic guided vehicle. Although the present embodiment is described taking an example of moving the robot arm 1 with the hand truck or the automatic guided vehicle installed in front of the machining device, the robot arm 1 may also be moved while moving the hand truck or the automatic guided vehicle. When moving the robot arm 1 while moving the hand truck or the automatic guided vehicle, positional information of the hand truck or the automatic guided vehicle is taken into the robot control device 14. A common way can be used as a moving mechanism and a control method for the hand truck or the automatic guided vehicle or a method of obtaining the positional information.

Any type of the force sensor 3 may be used as long as it outputs a signal indicative of a magnitude of an external force applied to the hand 2. For example, the force sensor 3 may be a pressure sensor, an image sensor, a strain gauge, or the like.

Figure 2:
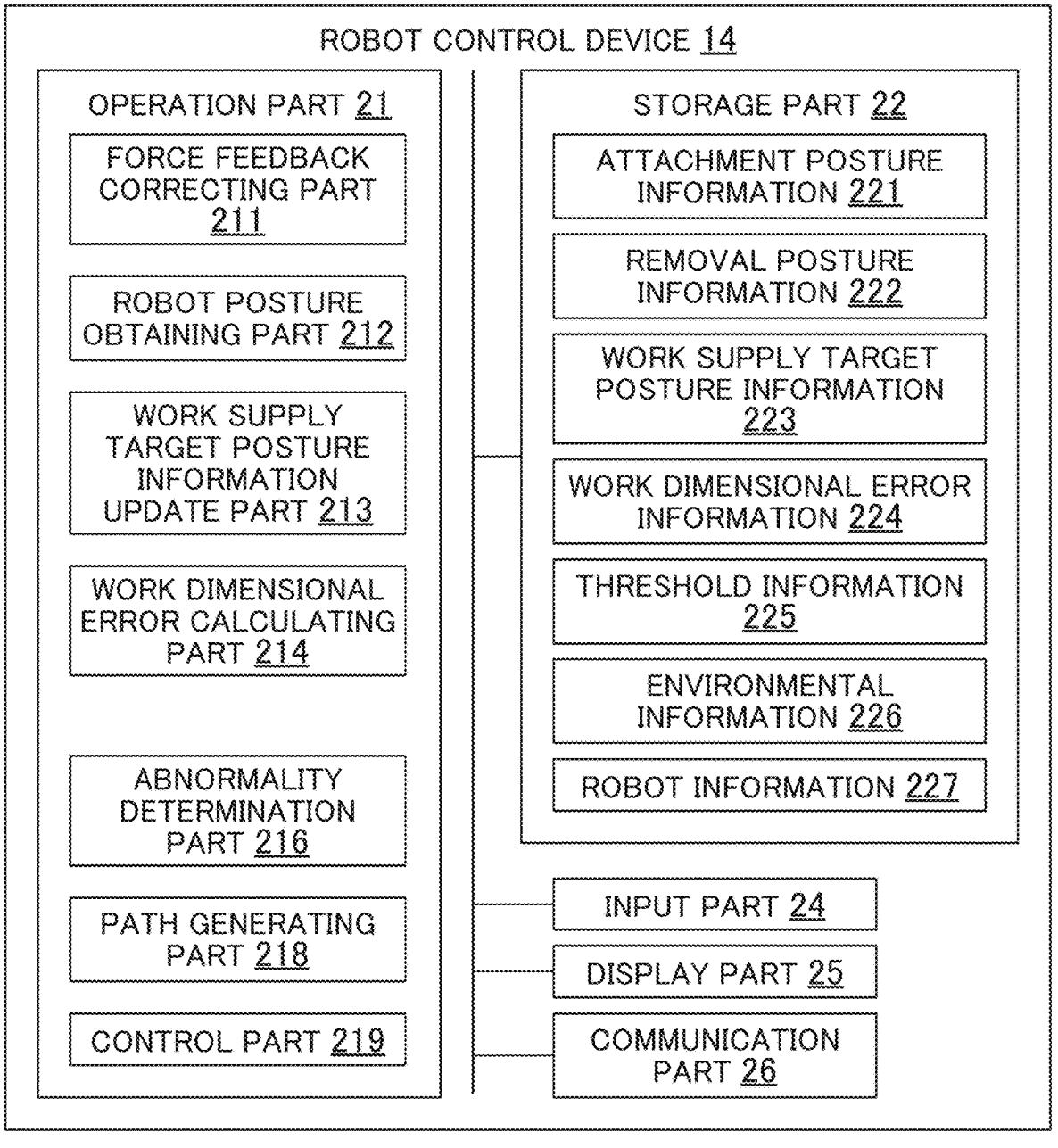
FIG. 2 is a block diagram illustrating an example of a configuration of a robot control device according to an embodiment of the present invention.

FIG. 2 is a block diagram illustrating an example of a configuration of the robot control device 14 according to an embodiment of the present invention.

The robot control device 14 is constituted by an operation part 21, a storage part 22, an input part 24, a display part 25, and a communication part 26. The operation part 21 includes a force feedback correcting part 211, a robot posture obtaining part 212, a work supply target posture information update part 213, a work dimensional error calculating part 214, an abnormality determination part 216, a path generating part 218, and a control part 219. Processes to be performed thereby will be described later.

The storage part 22 stores therein attachment posture information 221, removal posture information 222, work supply target posture information 223, work dimensional error information 224, threshold information 225, environmental information 226, and robot information 227. Details of this information will be described later.

The input part 24 is an input part that performs an input of various information, an input of a menu selection instruction, and an input of other instructions, and may be a keyboard, a mouse, a touch panel, a card reader, a microphone, or the like. Otherwise, the robot control device 14 may be configured to receive an input of information from another device via the communication part 26. The information input by the input part 24 is stored in the storage part 22. The display part 25 is a display part that performs a display of input information, a display of a processing result, a display of details of a process in progress, and the like, and may be a screen display device such as a liquid crystal monitor, LCD (Liquid Crystal Display), and a graphic card, a printing device, an audio output device such as a speaker, or the like. Otherwise, the robot control device 14 may be configured to output information to another device via the communication part 26. The communication part 26 is a communication part that transmits and receives information to and from another device such as the work supply device 10, the operation instruction device 12, and the like. Some components shown in FIG. 2 may be omitted, and other components may be added. It should be noted that all or part of the configuration of the robot control device 14 may be embodied by a virtual resource such as a cloud server.

Described below is a procedure of a process performed by the robot control device 14.

Figure 3B:
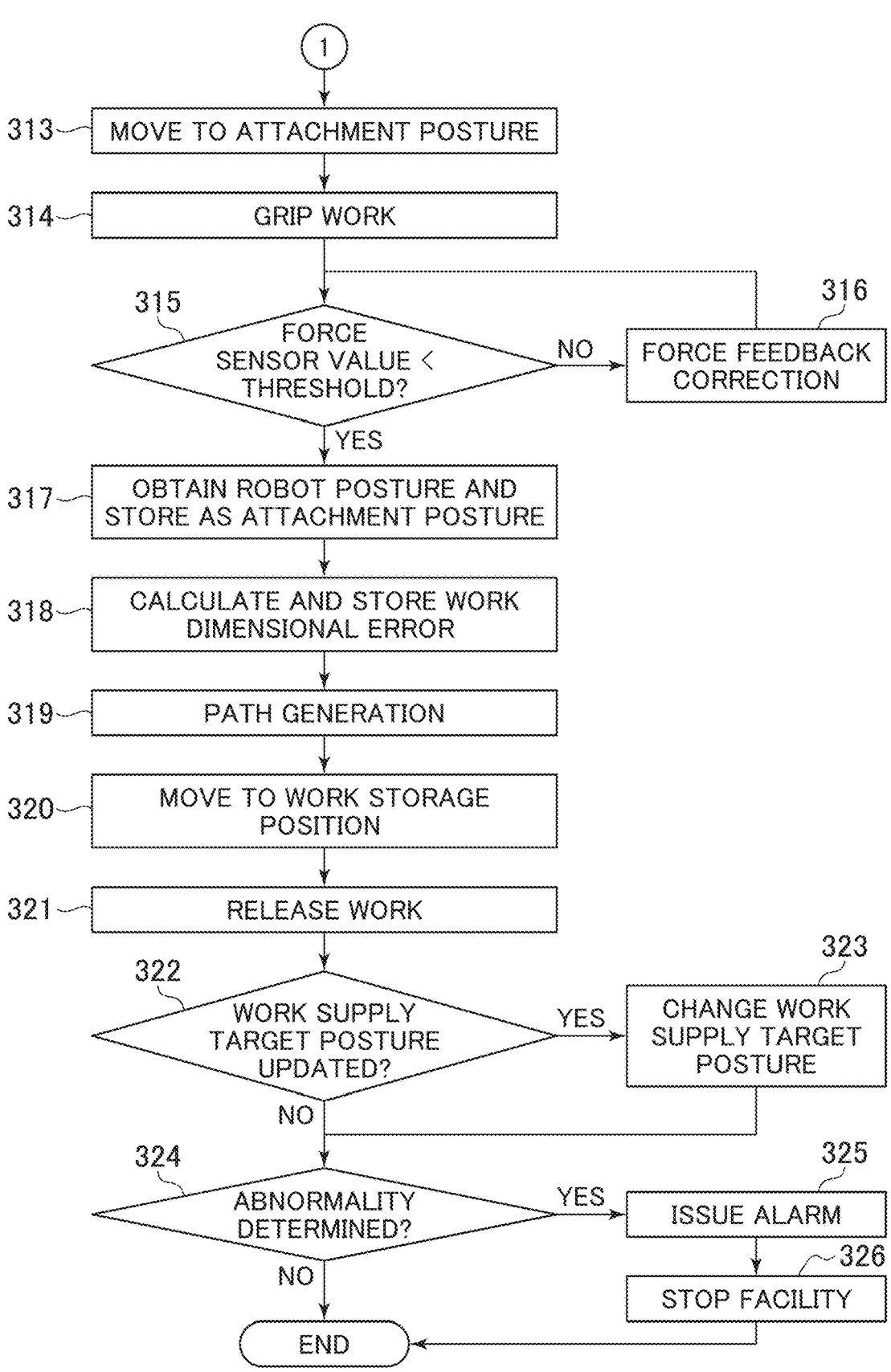
FIG. 3B is a flowchart illustrating an example process performed by the robot control device according to an embodiment of the present invention.

FIGS. 3A and 3B are flowcharts illustrating an example process performed by the robot control device 14 according to an embodiment of the present invention.

First, the control part 219 reads the work supply target posture information 223 (Step 301). The work supply target posture information 223 includes a target posture for supplying each work 4 to the chuck 5. Although the work supply target posture is described in the present embodiment using, for example, a coordinate value on each axis of X, Y, and Z to be a target of movement of the hand 2 gripping the work 4 and a roll angle, a pitch angle, and a yaw angle indicative of the posture of the hand 2 at the position indicated by the coordinate value (details will be described later with reference to FIG. 8), the work supply target posture may be constituted by a joint angle of the robot arm 1. In the present embodiment, every posture of the hand 2 gripping the work 4 is specified by the coordinate values on the axes of X, Y, and Z and the roll angle, the pitch angle, the yaw angle, or the joint angle as described above. The control part 219 obtains the work supply target posture associated with the work 4 to be machined from the work supply target posture information 223.

Next, the path generating part 218 generates a path for moving the work 4 to be machined from a standby position to the work supply target posture (Step 302). Since generation of the path can be performed in a manner similar to the conventional method, details thereof are not described herein.

Next, the control part 219 controls the robot arm 1 so that the hand 2 moves to the standby position of the work 4 to be machined, thereby controlling the hand 2 to grip the work 4 to be machined (Step 303). The control part 219 then controls the robot arm 1 to move the hand 2 gripping the work 4 to the work supply target posture via the path generated in Step 302 (Step 304).

When the hand 2 moves to the work supply target posture, the chuck 5 holds the work 4 (Step 305). For example, the work 4 is held by closing a plurality of nails constituting the chuck 5 to pinch the work 4.

Here, if the posture of the hand 2 in a state in which all the nails of the chuck 5 are in contact with the work 4 to hold the work 4 (also referred to as an attachment posture) is entirely identical to the work supply target posture, there is no force occurred to move the work 4 when the chuck 5 holds the work 4 and thus no external force is applied to the hand 2.

On the other hand, if the attachment posture deviates from the work supply target posture, then an external force is applied to the hand 2 to move from the work supply target posture to the attachment posture, which external force is measured by the force sensor 3. A magnitude of the external force indicates a size of the deviation between the attachment posture and the work supply target posture.

The force feedback correcting part 211 determines whether the measured value of the force sensor 3 is smaller than a predetermined threshold included in the threshold information 225 (Step 306). This threshold may be a termination threshold Tf of the force feedback correction included in the threshold information 225 (see FIG. 9). The same applies to determination in Step 315 to be described later. If the measured value of the force sensor 3 is not smaller than the threshold (Step 306: No), the force feedback correcting part 211 performs force feedback correction (Step 307).

For example, the force feedback correcting part 211 may find a direction in which the measured value of the force sensor decreases (i.e., the external force applied to the hand 2 decreases) by controlling the robot arm 1 to move the hand 2 by a micro distance and may move the hand 2 in that direction until the measured value of the force sensor is smaller than the threshold. Since a known method such as that described in Japanese Unexamined Patent Application Publication No. 2021-109295, for example, may be applicable as such a method, details thereof are not described herein.

When the measured value of the force sensor is smaller than the threshold, the robot posture obtaining part 212 obtains the postures of the robot arm 1 and the hand 2 at the point of time, and stores the postures as the attachment posture information 221 (Step 308). The path generating part 218 then generates a path from the attachment posture to a retracted position (Step 309). The control part 219 controls the hand 2 to release the work 4 and controls the robot arm 1 to be retracted to the retracted position (Step 310).

When the retraction is completed, the machining device starts machining the work 4 (Step 311). The control part 219 waits to receive a signal indicative of termination of machining from the machining device (Step 312), and when the machining is terminated (Step 312: Yes), the hand 2 again controls the robot arm 1 to move to the attachment posture (Step 313, and controls the hand 2 to grip the work 4 (Step 314).

Next, the force feedback correcting part 211 determines whether the measured value of the force sensor 3 is smaller than the predetermined threshold included in the threshold information 225 (Step 315). If the measured value of the force sensor 3 is not smaller than the threshold (Step 315: No), the force feedback correcting part 211 performs force feedback correction (Step 316). These steps are performed in a similar manner to the Steps 306 and 307 described above.

When the measured value of the force sensor is smaller than the threshold, the robot posture obtaining part 212 obtains the postures of the robot arm 1 and the hand 2 at the point of time, and stores the postures as the removal posture information 222 (Step 317). For example, in a case in which the machining device is a turning lathe, since a cylinder around an axis of rotation of the chuck 5 has been cut out by machining, the removal posture obtained when removing the work 4 after machining is the correct work supply posture (i.e., a posture desired to be set as the work supply target posture). Similarly, in a case of a machining device other than the turning lathe (such as an end milling machine), the removal posture of the work 4 after machining is the correct work supply posture.

Next, the work dimensional error calculating part 214 calculates a work dimensional error by calculating a difference between the attachment posture calculated in Step 308 and the removal posture calculated in Step 317, and stores the calculated work dimensional error as the work dimensional error information 224 (Step 318).

Next, the path generating part 218 generates a path from the removal posture to the storage position of the machined work 4 (Step 319). The control part 219 controls the robot arm 1 to move the work 4 to the storage position (Step 320), and releases the work 4 (Step 321).

Next, the work supply target posture information update part 213 determines whether to update the work supply target posture (Step 322), and if it is determined to update the work supply target posture (Step 322: Yes), the work supply target posture information update part 213 updates the work supply target posture (Step 323). Details of the determination in Step 322 and the update in Step 323 will be described later with reference to FIG. 6 and the like.

Next, the abnormality determination part 216 determines whether the work has an abnormality (Step 324). If it is determined that the work has an abnormality (Step 324: Yes), the abnormality determination part 215 issues an alarm (Step 325) and stops the facility (e.g., the machining device) (Step 326). Details of the determination in Step 324 will be described later with reference to FIG. 7 and the like.

Although processes after the determination that there is an abnormality is not described in detail in the present example, for example, the machining device may be automatically stopped or an alarm may be issued to the user as described later. This allows for an inspection of the facility, an inspection of the manufacturing process of the work, and the like, for example.

Figures 4A, 4B:
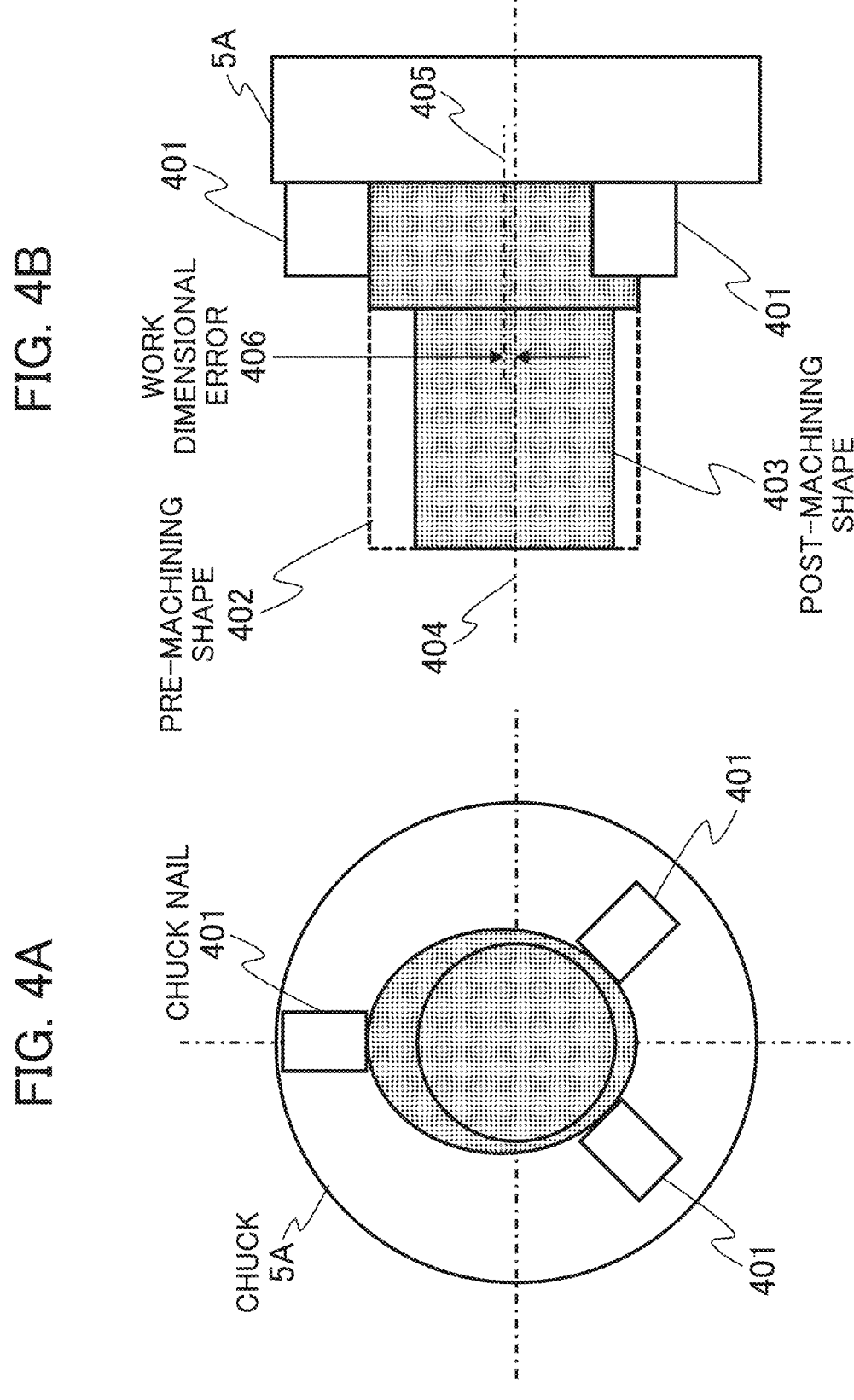
FIGS. 4A and 4B are explanatory drawings showing a first example of machining to which the work supply system according to an embodiment of the present invention is applied.

FIGS. 4A and 4B are an explanatory drawing showing a first example of machining to which the work supply system 100 according to an embodiment of the present invention is applied.

FIGS. 4A and 4B illustrates a lathe machining as the first example. Specifically, FIG. 4A shows a front view and a side view FIG. 4B of the chuck 5 in a case in which the machining device is the turning lathe. Herein, the chuck 5 of the turning lathe is described as a chuck 5A and the work 4 that is an object of the lathe machining held by the chuck 5A is described as a work 4A. Moreover, the front view shows the chuck 5A seen from a direction of supplying the work 4A on the axis of rotation.

The disk-shaped chuck 5A has a plurality of chuck nails 401. In the example of FIGS. 4A and 4B, three chuck nails 401 are provided, which radially move along a plane on which the work 4A is to be held and grip the work 4A. At a point of time before gripping the work 4A, each chuck nail 401 is located away from the axis of rotation of the chuck 5A. After the hand 2 (not shown in FIGS. 4A and 4B) moves the work 4A to the work supply target posture, each chuck nail 401 moves in a direction of the axis of rotation to grip the work 4A (Step 305). At this time, the work 4A may be sometimes moved from the posture as the work 4A was supplied due to the motion of the chuck nail 401. In such a case, the posture of the hand 2 is corrected according to the external force applied to the hand 2 by the movement, and the corrected value is stored as the attachment posture (Steps 306 to 308). Machining is then started (Step 311).

While the work 4A before machining is generally cylindrical in shape in the example of FIGS. 4A and 4B, there can be irregularity such as roughness on the surface because it is not yet machined. In the example of FIGS. 4A and 4B, the work 4A before machining generally has a shape of an elliptic cylinder. This work 4A is held and rotated by the chuck 5A to be subjected to cutting. A portion of the work 4A after the cutting has a cylindrical shape with a diameter smaller than that of the work 4A before machining, the center of which cylinder matches the axis of rotation 404 of the chuck 5A. Hatched portions shown in the front view FIG. 4A and the side view FIG. 4B indicate a post-machining shape 403 that is the shape of the work 4A after cutting, and a broken line portion shown in the side view FIG. 4B indicates a pre-machining shape 402 that is the shape of the work 4A before cutting.

As described above, regardless of the deviation of the work supply posture or the change in the shape of the work 4A before machining, the posture of the work 4A after machining is constant. Therefore, the posture of the hand 2 when gripping the work 4 after machining held by the chuck 5 is a desirable posture as the work supply target posture.

The center 405 of the work 4A before cutting does not necessarily match the axis of rotation 404 of the chuck 5A. The deviation 406 between them at this time is equivalent to the difference between the attachment posture stored in Step 308 and the removal posture stored in Step 317, which is calculated and stored as the work dimensional error (Step 318).

Figure 5A:
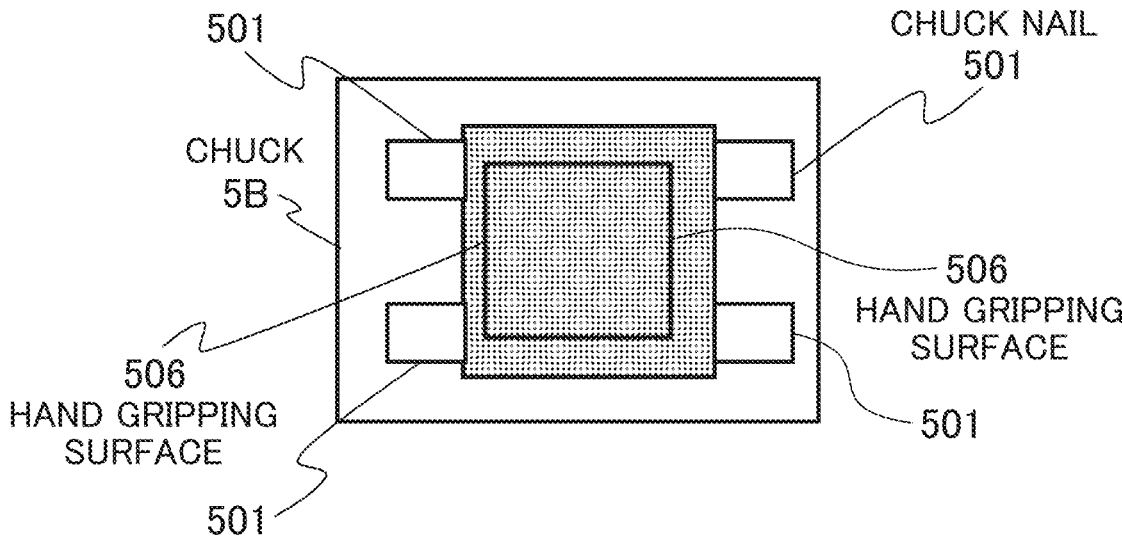
FIGS. 5A and 5B are explanatory drawings showing a second example of machining to which the work supply system according to an embodiment of the present invention is applied.
Figure 5B:
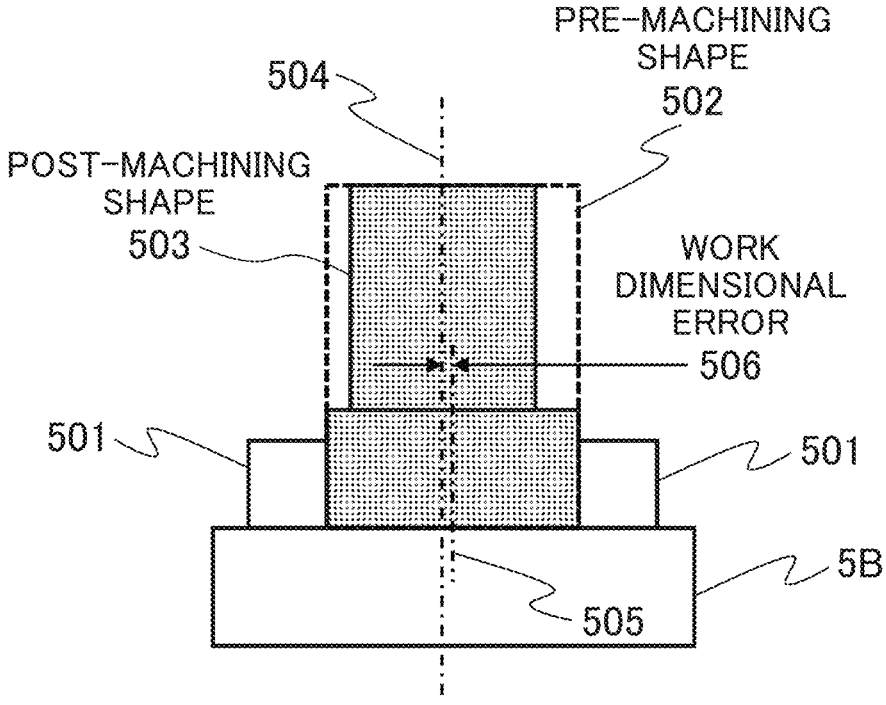

FIGS. 5A and 5B are an explanatory drawing showing a second example of machining to which the work supply system 100 according to an embodiment of the present invention is applied.

FIGS. 5A and 5B illustrate an end milling as the second example. Specifically, FIG. 5A shows a plan view and FIG. 5B shows a front view of the chuck 5 in a case in which the machining device is the end milling machine. Herein, the chuck 5 of the end milling machine is described as a chuck 5B and the work 4 that is an object of the end milling held by the chuck 5B is described as a work 4B.

The chuck 5B has a plurality of chuck nails 501. In the example of FIGS. 5A and 5B, four chuck nail 501 are provided, which move along a plane on which the work 4B is to be held and grip the work 4B. At a point of time before gripping the work 4B, each chuck nail 501 is located away from the axis of rotation of the chuck 5B. After the hand 2 (not shown in FIGS. 5A and 5B) moves the work 4B to the work supply target posture, each chuck nail 501 moves and grips the work 4A (Step 305). At this time, the work 4B may be sometimes moved from the posture as the work 4B was supplied due to the motion of the chuck nail 501. In such a case, the posture of the hand 2 is corrected according to the external force applied to the hand 2 by the movement, and the corrected value is stored as the attachment posture (Steps 306 to 308). Machining is then started (Step 311).

While the work 4B before machining is cuboidal in shape in the example of FIGS. 5A and 5B, there can be irregularity such as roughness on the surface because it is not yet machined. This work 4B is held by the chuck 5B to be subjected to cutting by the end milling machine. A portion of the work 4B after the cutting has a cuboidal shape smaller than the work 4B before machining. Hatched portions shown in the plan view FIG. 5A and the front view FIG. 5B indicate a post-machining shape 503 that is the shape of the work 4B after cutting, and a broken line portion shown in the front view FIG. 5B indicates pre-machining shape 502 that is the shape of the work 4B before cutting.

As with the example of the lathe machining illustrated in FIGS. 4A and 4B, the posture of the work 4B after machining is the desirable posture as the work supply target posture.

The center line 505 of the work 4B before cutting does not necessarily match the center line 504 of the work 4B after cutting. The deviation 506 between them at this time is equivalent to the difference between the attachment posture stored in Step 308 and the removal posture stored in Step 317, which is calculated and stored as the work dimensional error (Step 318).

Figure 6:
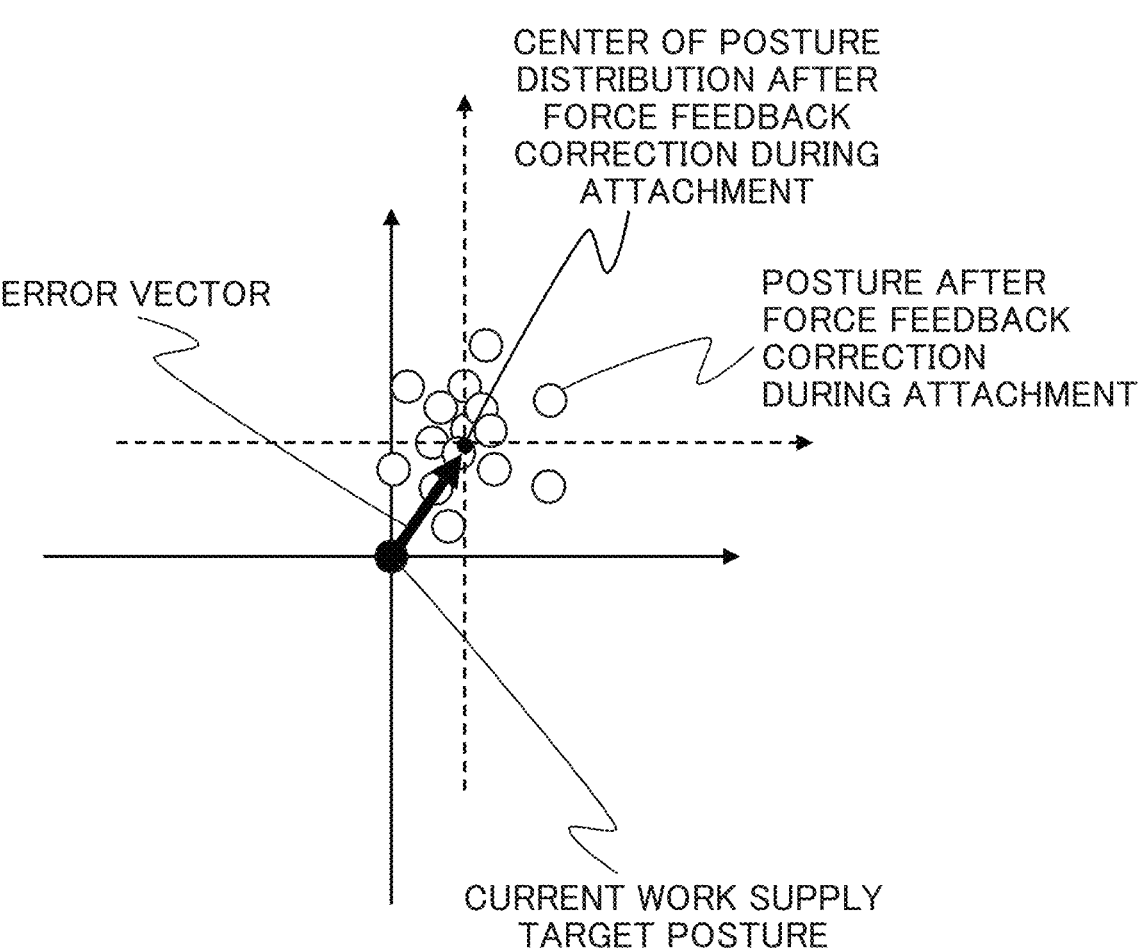
FIG. 6 is an explanatory drawing showing an example work supply target posture update performed by the robot control device according to an embodiment of the present invention.

FIG. 6 is an explanatory drawing showing an example work supply target posture update performed by the robot control device 14 according to an embodiment of the present invention.

FIG. 6 shows an example of a relation between the target posture of the robot control device 14 supplying the work 4 to the chuck 5, namely the work supply target posture, and an actual attachment posture. Although both the work supply target posture and the attachment posture are actually represented by a six-dimensional value consisting of an X coordinate, a Y coordinate, a Z coordinate, a roll angle, a pitch angle, and a yaw angle, FIG. 6 shows a plot on a two-dimensional space for explanation.

In the example of FIG. 6, a black dot indicates the work supply target posture. This is set as the target in Step 304. On the other hand, white dots indicate attachment postures stored in Step 308. These are values after the force feedback correction is performed in Step 307 if it is determined that the force sensor value is equal to or higher than the threshold in Step 306.

Every time the work 4 is supplied, the attachment posture of the work 4 is stored in Step 308. A plurality of white dots in FIG. 6 indicate a plurality of attachment postures in the past plotted thereon. The work supply target posture information update part 213 determines, in Step 322, whether the relation between the current work supply target posture (black dot) and distribution of the plurality of attachment postures in the past (white dots) satisfy a predetermined condition, and if the condition is satisfied, the work supply target posture information update part 213 may update the current work supply target posture to a new work supply target posture in Step 323.

For example, if a magnitude of an error vector from the current work supply target posture to the center of the distribution of a predetermined number of attachment posture in the immediate past exceeds the predetermined threshold, the current work supply target posture may be updated to the new work supply target posture (Step 322: Yes, Step 323). Here, the new work supply target posture may be the center of the distribution of the predetermined number of attachment posture in the immediate past. Moreover, the threshold for the determination in Step 322 may be, for example, a determination threshold Tp (see FIG. 9) for the work supply target posture update included in the threshold information 225.

Figure 7:
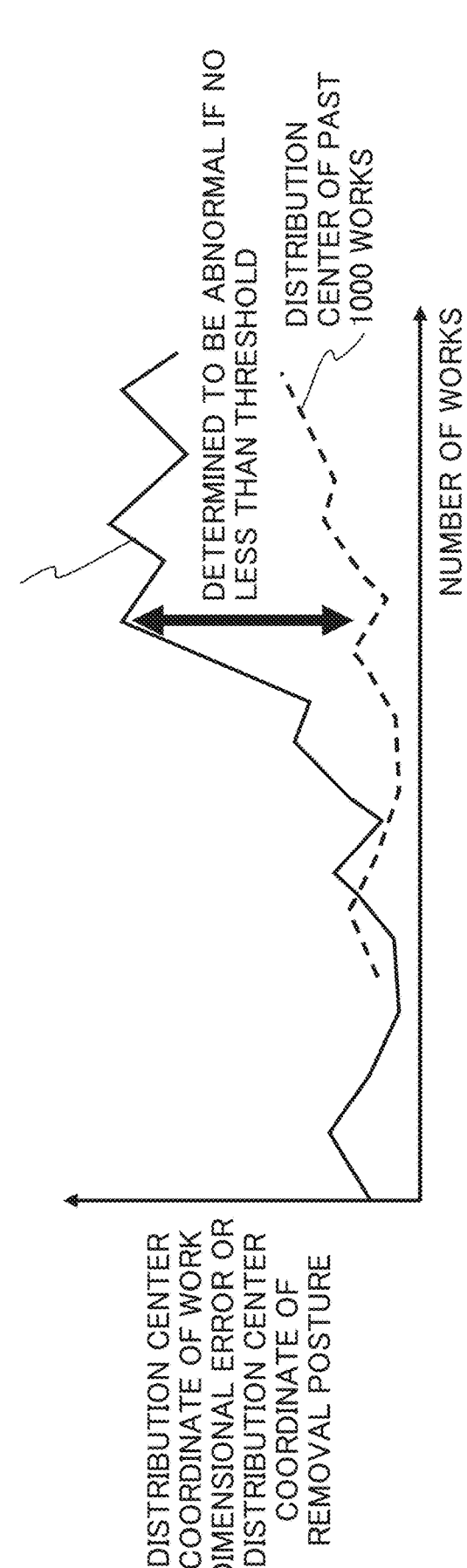
FIG. 7 is an explanatory drawing showing an example work abnormality determination performed by the robot control device according to an embodiment of the present invention.

FIG. 7 is an explanatory drawing showing an example work abnormality determination performed by the robot control device 14 according to an embodiment of the present invention.

The horizontal axis of the graph shown in FIG. 7 indicates the number of works 4 and the vertical axis indicates the center coordinate of the distribution of work dimensional errors. A solid line plotted in the graph in FIG. 7 indicates the center coordinate of the distribution of the work dimensional errors of the past 100 works, and the broken line indicates the center coordinate of the distribution of the work dimensional errors of the past 1000 works. It should be noted that the work dimensional error is actually represented by the six-dimensional value consisting of the X coordinate, the Y coordinate, the Z coordinate, the roll angle, the pitch angle, and the yaw angle.

Every time a new work 4 is machined, the processes shown in FIGS. 3A and 3B are performed, and the work dimensional error is calculated and stored in Step 318. In accordance with the number of works calculated by adding 1 to the number of works used for the last machining, the distribution center of the work dimensional errors calculated from the predetermined number of times of machining in the past at the time (e.g., 100 times) is plotted as the graph with the solid line. Moreover, the distribution center of the work dimensional errors calculated from the larger number of times of machining in the past at the time (e.g., 1000 times) is plotted as the graph with the broken line.

The work dimensional error is the difference between the attachment posture obtained in Step 308 and the removal posture calculated in Step 317. Change of the work dimensional error means the change in the shape of the work 4 before machining. In some cases the shape of the work 4 before machining changes drastically, and in other cases it changes gently. The abnormality determination part 216 determines the work abnormality based on the degree of the change in the shape of the work 4 before machining detected on the basis of the distribution of the work dimensional errors (Step 324).

For example, when the work 4 before machining is a casting, the shape of the work 4 before machining is gradually changed by its mold degrading gradually. Such a gentle change can be detected by comparing the distribution center of the work dimensional errors of the past 100 times with the distribution center of the work dimensional errors of the past 1000 times. For example, the work may be determined to be abnormal when the magnitude of the error vector between the distribution center of the work dimensional errors of the past 100 times and the distribution center of the work dimensional errors of the past 1000 times exceeds the predetermined threshold (Step 324: Yes). This threshold may be, for example, a determination threshold Twc with respect to a work dimensional error transition included in the threshold information 225 (see FIG. 9).

Alternatively, if the mold of the casting degrades drastically, or if it is replaced with a new mold, the shape of the work 4 before machining changes drastically. Such a drastic change can be detected by comparing a newly obtained work dimensional error with the distribution of the work dimensional errors obtained by then. For example, the work may be determined to be abnormal when the magnitude of the error vector between the newly obtained work dimensional error and the distribution center of the work dimensional errors for the predetermined number of times (e.g., 100 times) is larger than the predetermined threshold, or when the newly obtained work dimensional error is located away from the distribution center of the work dimensional errors for the predetermined number of times in the past by 3σ or more of the distribution (Step 324: Yes). The threshold may be, for example, an abnormality determination threshold Tws for the work dimensional error variation included in the threshold information 225 (see FIG. 9).

It should be noted that "100 times" and "1000 times" described above are merely examples and any other numbers can be used. For example, "100 times" is an example number of samples sufficient to reduce an influence of a noise in the measurement or a variation in the work dimension. Moreover, "1000 times" is an example number of the samples sufficiently larger than "100 times" described above. The same applies to the following description.

Although the work abnormality is detected on the basis of the distribution of the work dimensional errors in the above example, the abnormality determination part 216 can also detect an abnormality in the facility based on the distribution of the removal postures. Detection of the abnormality in the facility will be described below.

As described with reference to FIGS. 4A to 4B and the like, the posture of the work 4 after machining is constant without depending on the deviation of the work supply posture, a fluctuation in the shape of the work 4A before machining, and the like. If the removal posture has ever changed nevertheless, it means that some kind of change happened to the facility side. Specifically, the change in the removal posture may occur in a case in which, for example, the nails of the hand 2 for holding the work 4 is deformed due to an excessive load or the like. Such an abnormality in the facility can be detected on the basis of the distribution of the removal postures.

In this case, the vertical axis of the graph in FIG. 7 indicates the center coordinate of the distribution of the removal postures. Every time a new work 4 is machined, the processes shown in FIGS. 3A and 3B are performed, and the removal posture is obtained and stored in Step 317. In accordance with the number of works calculated by adding 1 to the number of works used for the last machining, the distribution center of the removal postures obtained from the past 100 times of machining by then is plotted as the graph of the solid line. Moreover, the distribution center of the removal postures calculated from the past 1000 times of machining by then is plotted as the graph of the broken line.

In some cases a state of the facility that may cause the fluctuation in the removal posture (e.g., a state of the nails of the hand 2) changes gently, and in other cases it changes drastically. The abnormality determination part 216 determines the abnormality in the facility based on the state of the facility detected on the basis of the distribution of the removal postures (Step 324).

For example, the gentle change in the state of the facility can be detected by comparing the distribution center of the removal postures in the past 100 times with the distribution center of the removal postures in the past 1000 times. For example, the facility may be determined to be abnormal when the magnitude of the error vector between the distribution center of the removal postures in the past 100 times and the distribution center of the removal postures in the past 1000 times exceeds the predetermined threshold (Step 324: Yes). This threshold may be, for example, an abnormality determination threshold Trc for the removal posture error center position included in the threshold information 225 (see FIG. 9).

The drastic change in the state of the facility can be detected by comparing a newly obtained removal posture with the distribution of the removal postures obtained by then. For example, the facility may be determined to be abnormal when the magnitude of the error vector between the newly obtained removal postures and the distribution center of the removal postures for the predetermined number of times in the past (e.g., 100 times) is equal to or larger than the predetermined threshold, or when the newly obtained removal posture is located away from the distribution center of the removal postures for the predetermined number of times in the past by 3σ or more of the distribution (Step 324: Yes). The threshold may be, for example, an abnormality determination threshold Trs for the removal posture error variation included in the threshold information 225 (see FIG. 9).

FIG. 8 is an explanatory drawing showing an example of attachment posture information 221, removal posture information 222, work supply target posture information 223, and work dimensional error information 224 retained by the robot control device 14 according to an embodiment of the present invention.

The attachment posture information 221, the removal posture information 222, the work supply target posture information 223, and the work dimensional error information 224 are all stored in the storage part 22 as information about the same format. Description is given herein taking an example of the attachment posture information 221.

The attachment posture information 221 includes an identification number 801, an x coordinate value 802, a y coordinate value 803, a z coordinate value 804, a roll angle 805, a pitch angle 806, and a yaw angle 807.

The identification number 801 is a serial number of a set of posture information included in the attachment posture information 221. The identification number 801 may be, for example, identification information of each work 4. The x coordinate value 802, the y coordinate value 803, the z coordinate value 804, the roll angle 805, the pitch angle 806, and the yaw angle 807 indicate the attachment posture of each work 4. That is, force feedback correction is performed on each work 4 as needed (Step 307), and when the force sensor value is smaller than the predetermined threshold (Step 306: Yes), the coordinate value and the angle indicative of the posture of the hand 2 at the point of time are stored as the x coordinate value 802, the y coordinate value 803, the z coordinate value 804, the roll angle 805, the pitch angle 806, and the yaw angle 807.

The same applies to the format of the removal posture information 222, the work supply target posture information 223, and the work dimensional error information 224 as described above. For example, the coordinate value and the angle indicative of the posture of the hand 2 obtained in Step 317 are stored as the x coordinate value 802, the y coordinate value 803, the z coordinate value 804, the roll angle 805, the pitch angle 806, and the yaw angle 807 of the removal posture information 222. Moreover, the coordinate value and the angle indicative of the posture of the hand 2 when supplying each work 4 to the chuck 5 as set in advance are stored as the x coordinate value 802, the y coordinate value 803, the z coordinate value 804, the roll angle 805, the pitch angle 806, and the yaw angle 807 of the work supply target posture information 223. These coordinate values and angles are updated when it is determined to update the work supply target posture in Step 322.

Moreover, the coordinate value and the angle indicative of the posture of the hand 2 that is equivalent to the work dimensional error calculated in Step S318) (e.g., the difference between the coordinate value and the angle indicative of the removal posture obtained in Step 317 and the coordinate value and the angle indicative of the attachment postured obtained in Step 308) is stored as the x coordinate value 802, the y coordinate value 803, the z coordinate value 804, the roll angle 805, the pitch angle 806, and the yaw angle 807 of the work dimensional error information 224.

Although the coordinate value and the angle indicative of the posture of the hand 2 is stored in the above example, other information such as the joint angle of the robot arm 1 may be stored alternatively.

FIG. 9 is an explanatory drawing showing an example of threshold information 225 retained by the robot control device 14 according to an embodiment of the present invention.

The threshold information 225 includes, for example, the termination threshold for the force feedback correction (Tf), the determination threshold for the work supply target posture update (Tp), the abnormality determination threshold for the removal posture error variation (Trs), the abnormality determination threshold for the removal posture error center position (Trc), the abnormality determination threshold for the work dimensional error variation (Tws), and the determination threshold with respect to the work dimensional error transition (Twc).

As the termination threshold for the force feedback correction (Tf), a threshold for the magnitude of the external force measured by the force sensor 3, such as IN, is registered. As the determination threshold for the work supply target posture update (Tp), the abnormality determination threshold for the removal posture error variation (Trs), the abnormality determination threshold for the removal posture error center position (Trc), the abnormality determination threshold for the work dimensional error variation (Tws), and the determination threshold with respect to the work dimensional error transition (Twc), respectively, the threshold used for a comparison between the value of the posture and the value of the distribution of the postures, or comparison between the distributions of the values of the postures, such as 3 mm, 4 mm, and the like, for example, is registered.

The storage part 22 of the robot control device 14 further stores therein the environmental information 226 and the robot information 227. The environmental information 226 includes, for example, three-dimensional model information of the machining device and a peripheral equipment (e.g., a conveyor, a shelf, and the like). The robot information 227 includes the three-dimensional model information of the robot arm 1 and the hand 2 and information indicative of a movable range for the joint angle of the robot arm 1. The aforementioned three-dimensional model information may take a common form as used in a CAD, for example. For these types of information, figures and detailed descriptions are omitted.

Figure 10:
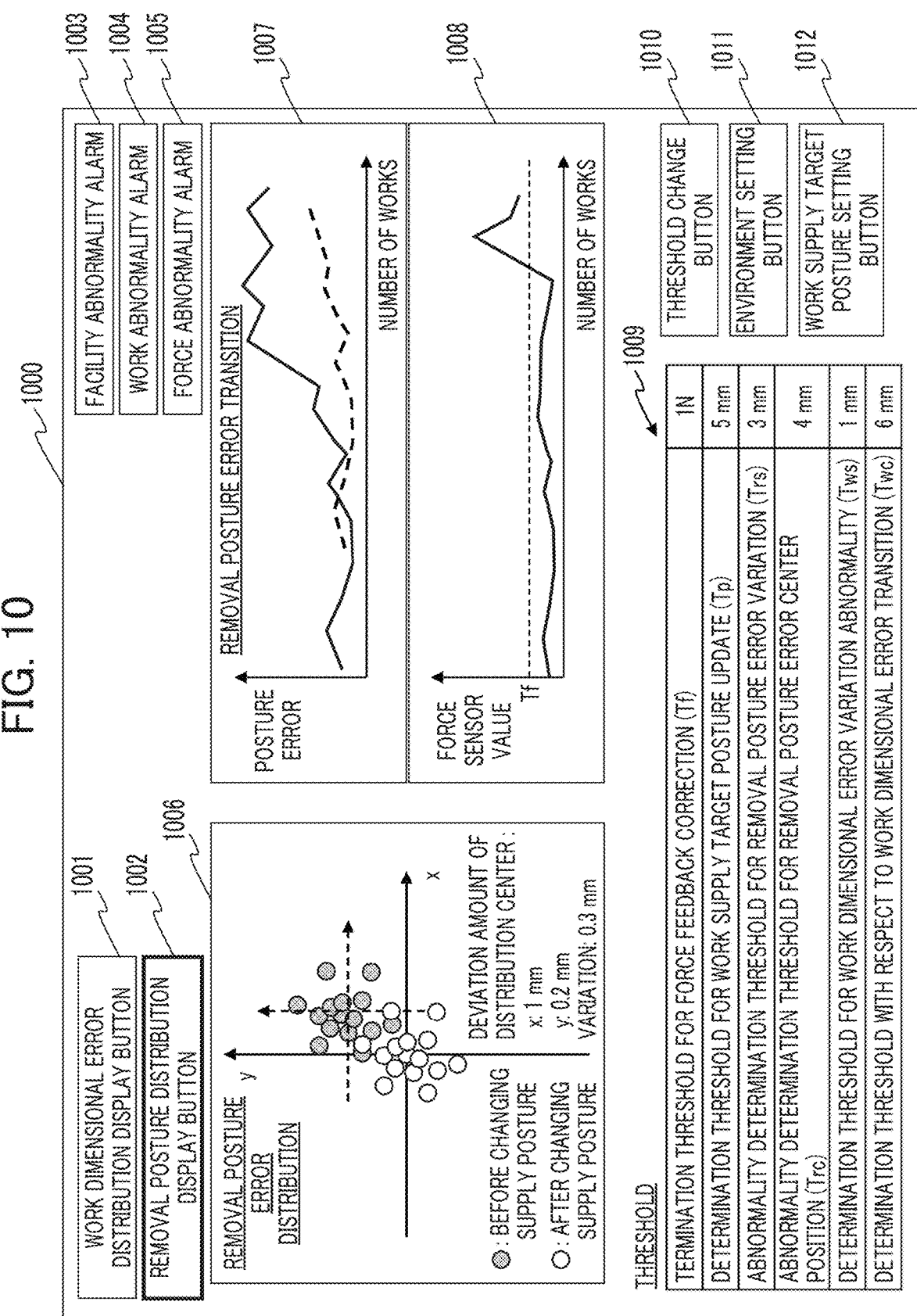
FIG. 10 is an explanatory drawing showing a first example of information output by the robot control device according to an embodiment of the present invention.

FIG. 10 is an explanatory drawing showing a first example of information output by the robot control device 14 according to an embodiment of the present invention.

A screen 1000 shown in FIG. 10 is an example of the screen displayed by the display part 25 of the robot control device 14, and includes, for example, a work dimensional error distribution display button 1001, a removal posture error distribution display button 1002, a facility abnormality alarm display part 1003, a work abnormality alarm display part 1004, a force abnormality alarm display part 1005, an error distribution display part 1006, an error transition display part 1007, a force sensor value display part 1008, a threshold display part 1009, a threshold change button 1010, an environment setting button 1011, and a work supply target posture setting button 1012.

The work dimensional error distribution display button 1001 and the removal posture error distribution display button 1002 are operated by the user to select either display of the distribution of the work dimensional errors and the removal posture errors. FIG. 10 shows an example of the case in which the removal posture error distribution display button 1002 is operated.

In this case, the error distribution display part 1006 displays the distribution of the errors of the removal posture obtained in the past in Step 317. Although the x coordinate values and the y coordinate values of the removal posture are plotted in the two-dimensional space in FIG. 10, a combination of other two coordinate values or a combination of any of the roll angle, the pitch angle, and the yaw angle may be plotted. Moreover, for example, a perspective view of a three-dimensional space in which three-dimensional coordinate values are plotted may be displayed.

The example of FIG. 10 shows, in a case in which change of the work supply target posture (Step 323) is performed, the removal postures obtained before the change with black dots and the removal postures obtained after the change with white dots. Moreover, a degree of deviation of the distributions before and after the change (e.g., a deviation amount between the respective distribution centers) and the magnitude of the variation in each distribution may be displayed. Comparing them allows for confirming an effect of changing the work supply target posture.

The error transition display part 1007 displays a graph showing the number of works on the horizontal axis and the error of the removal posture calculated in Step 317 on the vertical axis. As shown in FIG. 7, the distribution center of the errors of the removal postures of the past 100 works may be indicated by a solid line and the distribution center of the errors of the removal postures of the past 1000 works may be indicated by a broken line.

The error transition display part 1007 may graphically display the magnitude of the error vector between the distribution center of the removal postures in the past 100 times and the distribution center of the removal postures in the past 1000 times. Furthermore, the abnormality determination threshold for the removal posture error center position (Trc) may be displayed, it is determined that there is an abnormality in the facility if, for example, the difference between the distribution center of errors of the removal postures in the past 100 works and the distribution center of errors of the removal postures in the past 1000 works is equal to or larger than the abnormality determination threshold for the removal posture error center position (Trc), and the facility abnormality alarm display part 1003 may display an alarm.

The force sensor value display part 1008 displays a graph showing the number of works on the horizontal axis and the measured value of the force sensor 3 obtained in Steps 306 and 315 on the vertical axis. The force sensor value display part 1008 further displays the termination threshold for the force feedback correction (Tf). For example, the force abnormality alarm display part 1005 may display an alarm when the measured value of the force sensor 3 is equal to or larger than the termination threshold for the force feedback correction (Tf).

The threshold display part 1009 displays a threshold for each item similar to those shown in FIG. 9.

The user can change the threshold for any item included in the threshold information 225 by operating the threshold change button 1010. For example, by operating the threshold change button 1010, the display part displays another screen (not shown), where the user may change the threshold manually. Alternatively, the user may set the threshold by inputting the desired threshold to the threshold display part 1009 and operating the threshold change button 1010.

Moreover, the user can set the environmental information 226 by operating the environment setting button 1011. For example, the user may input the three-dimensional model of the facility including the work supply device 10, the work 4, and the like.

The user can also set the work supply target posture to any value by operating the work supply target posture setting button 1012. For example, by operating the work supply target posture setting button 1012, the display part displays another screen (not shown), where the user may input the work supply target posture. At this time, a recommended value calculated from the deviation amount of the center of the distribution of the removal postures may be displayed. For example, the center of the distribution of the removal postures may be the recommended value of the new work supply target posture.

Figure 11:
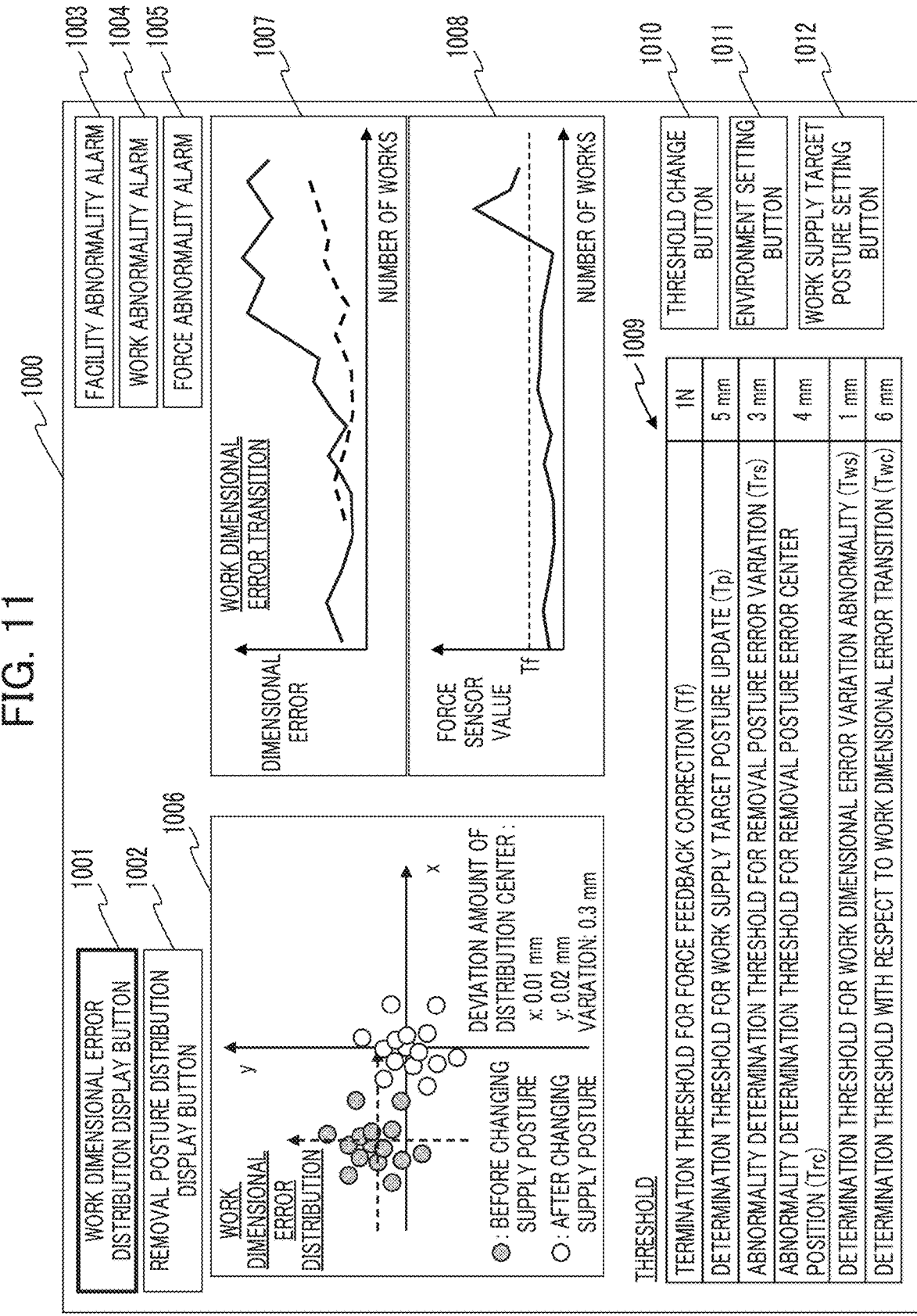
FIG. 11 is an explanatory drawing showing a second example of information output by the robot control device according to an embodiment of the present invention.

FIG. 11 is an explanatory drawing showing a second example of information output by the robot control device 14 according to an embodiment of the present invention.

In the following, differences from FIG. 10 will be described.

FIG. 11 shows an example case in which the work dimensional error distribution display button 1001 is operated. In this case, the error distribution display part 1006 displays the distribution of the work dimensional errors obtained in the past in Step 318. Although the x coordinate values and the y coordinate values of the work dimensional error are plotted in the two-dimensional space in the example of FIG. 11, a combination of other two coordinate values or a combination of any of the roll angle, the pitch angle, and the yaw angle may be plotted. Moreover, for example, a perspective view of a three-dimensional space in which three-dimensional coordinate values are plotted may be displayed.

The example of FIG. 11 shows, in a case in which the change of the work supply target posture (Step 323) is performed, the work dimensional error obtained before the change with black dots and the work dimensional error obtained after the change with white dots. Comparing them allows for confirming an effect of changing the work supply target posture.

The error transition display part 1007 displays a graph showing the number of works on the horizontal axis and the work dimensional error calculated in Step 318 on the vertical axis. As shown in FIG. 7, the distribution center of the work dimensional errors of the past 100 works may be indicated by a solid line and the distribution center of the work dimensional errors of the past 1000 works may be indicated by a broken line.

The error transition display part 1007 may graphically display the magnitude of the error vector between the distribution center of the removal postures in the past 100 times and the distribution center of the removal postures in the past 1000 times. Furthermore, the determination threshold with respect to the work dimensional error transition (Twc) may be displayed, it is determined that there is a work abnormality, for example, if the difference between the distribution center of the work dimensional errors of the past 100 works and the distribution center of the work dimensional errors of the past 1000 works is equal to or larger than the determination threshold with respect to the work dimensional error transition (Twc), and the work abnormality alarm display part 1004 may display an alarm.

The system according to an embodiment of the present invention may also be configured as follows.

(1) In a robot control device (e.g., the robot control device 14) for controlling a robot (e.g., the work supply device 10 including the robot arm 1 and the hand 2) that attaches and removes a work (e.g., the work 4) with respect to a machining device, the robot control device includes: a correcting part (e.g., the force feedback correcting part 211)) that corrects a posture of the robot based on a measured value of a sensor (e.g., the force sensor 3) that measures a load on the robot; a robot posture obtaining part (e.g., robot posture obtaining part 212) that obtains the posture of the robot; a storage part (e.g., storage part 22) that stores the posture of the robot obtained by the robot posture obtaining part; a work attachment target posture generating part (e.g., work supply target posture update part 213) that generates a work attachment target posture that is a target posture to attach the work to the machining device; and a path generating part (e.g., path generating part 218) that generates a motion of the robot corresponding to the work attachment target posture. The correcting part corrects the posture of the robot to decrease the load on the robot to be smaller than a threshold set in advance when the robot grips the work after machining by the machining device (e.g., Steps 315, 316). The robot posture obtaining part obtains a removal posture that is the posture of the robot after the correction for a plurality of the works after machining and stores the removal posture in the storage part (e.g., Step 317). The work attachment target posture generating part generates a new work attachment target posture (e.g., the new work supply target posture) based on a plurality of the removal postures stored in the storage part (e.g., Step 323).

Therefore, it is possible to correct a deviation of a posture of a robot supplying a work while continuing production using the work to be machined.

(2) In the robot control device according to the above-described (1), further includes an abnormality determination part (e.g., the abnormality determination part 216) that determines an abnormality in a facility including the robot based on a fluctuation of the removal posture.

This makes it possible to detect an abnormality in the facility.

(3) In the robot control device according to the above-described (2), the abnormality determination part determines that the facility is abnormal when the newly obtained removal posture is located away from a distribution of the plurality of the removal postures in the past more than a predetermined criterion (e.g., when the newly obtained removal posture is located away from the distribution center of the removal postures in the past by 3σ or more, or when a magnitude of a difference between the newly obtained removal posture and the distribution center of the removal postures in the past exceeds the predetermined threshold) (e.g., Step 324).

This makes it possible to detect an abnormality in the facility based on a drastic change in the state of the facility.

(4) In the robot control device according to the above-described (2), the abnormality determination part determines that the facility is abnormal when the distribution of a first predetermined number (e.g., 100) of the removal postures in the past is located away from a distribution of a second predetermined number (e.g., 1000) of the removal postures in the past more than a predetermined criterion (e.g., when a magnitude of a difference between the distribution centers of the both exceeds a predetermined threshold), the second predetermined number being larger than the first predetermined number (e.g., Step 324).

This makes it possible to detect an abnormality in the facility based on a gentle change in the state of the facility.

(5) In the robot control device according to the above-described (2), the abnormality determination part outputs an alarm indicative of an abnormality in the facility when it is determined that the facility is abnormal (e.g., Step 325).

This makes it possible to notify the user of the abnormality in the facility, thereby leading to a countermeasure.

(6) In the robot control device according to the above-described (1), the correcting part corrects a posture of the robot to decrease a load on the robot when the robot moves the work before machining to a work attachment target posture and a holding device of the machining device holds the work before machining (e.g., Steps 304-307). The robot posture obtaining part obtains an attachment posture indicative of a posture of the robot after correction and stores the attachment posture in the storage part for a plurality of the works before machining (e.g., Step 308). The robot control device further includes: a work dimensional error calculating part that calculates a work dimensional error based on a difference between the attachment posture and the removal posture (e.g., the work dimensional error calculating part 214); and an abnormality determination part that determines an abnormality in the work based on the work dimensional error (e.g., the abnormality determination part 216).

This makes it possible to detect a work abnormality.

(7) In the robot control device according to the above-described (6), the abnormality determination part determines that the work is abnormal when the newly obtained work dimensional error is located away from a distribution of a plurality of the work dimensional errors in the past more than a predetermined criterion (e.g., when the newly obtained work dimensional error is located away from a distribution center of the work dimensional errors in the past by 3σ or more, or when a magnitude of a difference between the newly obtained work dimensional error and the distribution center of the work dimensional errors in the past exceeds a predetermined threshold) (e.g., Step 324).

This makes it possible to detect a work abnormality based on a drastic change in the state of the work.

(8) In the robot control device according to the above-described (6), the abnormality determination part determines that the work is abnormal when the distribution of the first predetermined number (e.g., 100) of the work dimensional errors in the past is located away from the distribution of the second predetermined number (e.g., 1000) of the work dimensional errors in the past more than a predetermined criterion, the second predetermined number being larger than the first predetermined number (e.g., when the magnitude of the difference between the distribution center of the both exceeds a predetermined threshold) (e.g., Step 324).

This makes it possible to detect a work abnormality based on a gentle change in the state of the work.

(9) In the robot control device according to the above-described (6), the abnormality determination part outputs an alarm indicative of an abnormality in the work when it is determined that the work is abnormal (e.g., Step 325).

This makes it possible to notify the user of the work abnormality, thereby leading to a countermeasure.

(10) In the robot control device according to the above-described (1), the sensor is a sensor that outputs a signal indicative of a magnitude of external force applied to a hand of the robot gripping the work.

This makes it possible to measure the load on the robot.

(11) In the robot control device according to the above-described (10), the sensor is a force sensor, a pressure sensor, an image sensor, or a strain gauge.

This makes it possible to measure the load on the robot.

(12) In the robot control device according to the above-described (1), the work attachment target posture generating part generates a center of the plurality of removal postures stored in the storage part as a new work attachment target posture.

This makes it possible to appropriately update the work attachment target posture.

It should be noted that the present invention is not limited to the embodiment described above but includes various modifications thereof. For example, the above embodiments are described in detail for better understanding of the invention and not necessarily intended to limit the invention to include all of the configurations described herein. Moreover, a part of a configuration in one embodiment can be replaced with a configuration in another embodiment, and a configuration of one embodiment can be added to a configuration in another embodiment. In addition, part of the configuration of each of the embodiments can be subjected to addition, deletion, and replacement with respect to other configurations.

Moreover, each configuration, function, processing part, processing means or the like described above may be implemented with hardware by designing a part or all thereof with an integrated circuit or the like, for example. In addition, each configuration, function, or the like described above may be implemented with software by interpreting and executing a program that causes a processor to achieve respective functions thereof. Information such as a program that achieves each function, a table, a file, or the like can be stored in a storage device such as a nonvolatile semiconductor memory, a hard disk drive, an SSD (Solid State Drive), and the like, or a computer-readable non-transitory data storage medium such as an IC card, an SD card, a DVD, and the like.

Moreover, this application describes control lines and information lines that are supposed to be necessary for explanation and not necessarily all the control lines and the information lines to be included in a product. It may be considered actually almost all the configurations are connected to one another.

LIST OF REFERENCE SIGNS

1: robot arm
2: hand
3: force sensor
4: work
5: chuck
10: work supply device
12: operation instruction device
14: robot control device
100: work supply system

The invention claimed is:

1. A robot control device for controlling a robot that attaches and removes a work with respect to a machining device, the robot control device comprising:

a correcting part that corrects a posture of the robot based on a measured value of a sensor that measures a load on the robot;

a robot posture obtaining part that obtains the posture of the robot;

a storage part that stores the posture of the robot obtained by the robot posture obtaining part;

a work attachment target posture generating part that generates a work attachment target posture that is a target posture to attach the work to the machining device; and a path generating part that generates a motion of the robot corresponding to the work attachment target posture, wherein the correcting part corrects the posture of the robot to decrease the load on the robot to be smaller than a threshold set in advance when the robot grips the work after machining by the machining device, wherein the robot posture obtaining part obtains a removal posture that is the posture of the robot after the correction for a plurality of the works after machining and stores the removal posture in the storage part, and wherein the work attachment target posture generating part generates a new work attachment target posture based on a plurality of the removal postures stored in the storage part.

2. The robot control device according to claim 1, further comprising an abnormality determination part that determines an abnormality in a facility including the robot based on a fluctuation of the removal posture.

3. The robot control device according to claim 2, wherein the abnormality determination part determines that the facility is abnormal when the newly obtained removal posture is located away from a distribution of the plurality of the removal postures in the past more than a predetermined criterion.

4. The robot control device according to claim 2, wherein the abnormality determination part determines that the facility is abnormal when the distribution of a first predetermined number of the removal postures in the past is located away from a distribution of a second predetermined number of the removal postures in the past more than a predetermined criterion, the second predetermined number being larger than the first predetermined number.

5. The robot control device according to claim 2, wherein the abnormality determination part outputs an alarm indicative of an abnormality in the facility when it is determined that the facility is abnormal.

6. The robot control device according to claim 1, wherein the correcting part corrects a posture of the robot to decrease a load on the robot when the robot moves the work before machining to a work attachment target posture and a holding device of the machining device holds the work before machining, wherein the robot posture obtaining part obtains an attachment posture indicative of a posture of the robot after correction and stores the attachment posture in the storage part for the plurality of the works before machining, and wherein the robot control device further comprises:

a work dimensional error calculating part that calculates a work dimensional error based on a difference between the attachment posture and the removal posture; and an abnormality determination part that determines an abnormality in the work based on the work dimensional error.

7. The robot control device according to claim 6, wherein the abnormality determination part determines that the work is abnormal when the newly obtained work dimensional error is located away from a distribution of a plurality of the work dimensional errors in the past more than a predetermined criterion.

8. The robot control device according to claim 6, wherein the abnormality determination part determines that the work is abnormal when the distribution of the first predetermined number of the work dimensional errors in the past is located away from the distribution of the second predetermined number of the work dimensional errors in the past more than a predetermined criterion, the second predetermined number being larger than the first predetermined number.

9. The robot control device according to claim 6, wherein the abnormality determination part outputs an alarm indicative of an abnormality in the work when it is determined that the work is abnormal.

10. The robot control device according to claim 1, wherein the sensor is a sensor that outputs a signal indicative of a magnitude of external force applied to a hand of the robot gripping the work.

11. The robot control device according to claim 10, wherein the sensor is a force sensor, a pressure sensor, an image sensor, or a strain gauge.

12. The robot control device according to claim 1, wherein the work attachment target posture generating part generates a center of the plurality of removal postures stored in the storage part as a new work attachment target posture.

13. A robot control method performed by a robot control device for controlling a robot that attaches and removes a work with respect to a machining device, the method comprising:

a correction step in which the robot control device corrects a posture of the robot based on a measured value of a sensor that measures a load on the robot;

a robot posture obtaining step in which the robot control device obtains and stores the posture of the robot;

a work attachment target posture generation step in which the robot control device generates a work attachment target posture that is a target posture to attach the work to the machining device; and a path generation step in which the robot control device generates a motion of the robot corresponding to the work attachment target posture, wherein, in the correction step, the robot control device corrects the posture of the robot to decrease the load on the robot to be smaller than a threshold set in advance when the robot grips the work after machining by the machining device, wherein, in the robot posture obtaining step, the robot control device obtains and stores a removal posture that is the posture of the robot after the correction for a plurality of the works after machining, and wherein, in the work attachment target posture generation step, the robot control device generates a new work attachment target posture based on a plurality of the stored removal postures.

* * * * *